(12) United States Patent
Grant et al.

(10) Patent No.: US 11,406,130 B2
(45) Date of Patent: Aug. 9, 2022

(54) CONTAINER

(71) Applicant: BRH INTERNATIONAL, Hauppauge, NY (US)

(72) Inventors: Gabriel Grant, Alexandria, VA (US); Bryan Gerber, Los Angeles, CA (US)

(73) Assignee: BRH INTERNATIONAL, Hauppauge, NY (US)

( * ) Notice: Subject to any disclaimer, the term of this patent is extended or adjusted under 35 U.S.C. 154(b) by 55 days.

(21) Appl. No.: 16/514,991

(22) Filed: Jul. 17, 2019

(65) Prior Publication Data

US 2020/0022406 A1   Jan. 23, 2020

Related U.S. Application Data

(60) Provisional application No. 62/699,731, filed on Jul. 17, 2018.

(51) Int. Cl.
| | |
|---|---|
| *A47J 42/14* | (2006.01) |
| *A24F 23/04* | (2006.01) |
| *B02C 23/10* | (2006.01) |
| *B02C 18/08* | (2006.01) |
| *A47J 42/04* | (2006.01) |
| *A47J 42/34* | (2006.01) |

(52) U.S. Cl.
CPC .............. *A24F 23/04* (2013.01); *A47J 42/04* (2013.01); *A47J 42/34* (2013.01); *B02C 18/08* (2013.01); *B02C 23/10* (2013.01)

(58) Field of Classification Search
CPC .. A47J 42/14; A47J 42/34; A47J 42/36; A47J 42/38; A47J 42/24

USPC ........................................... 241/169.1, 278.1
See application file for complete search history.

(56) References Cited

U.S. PATENT DOCUMENTS

| | | | | |
|---|---|---|---|---|
| 8,083,167 | B1* | 12/2011 | Namakian ............... | A47J 42/24 |
| | | | | 241/169.1 |
| 8,695,906 | B2* | 4/2014 | Hainbach ................ | A47J 42/14 |
| | | | | 241/169.1 |
| 9,681,777 | B1* | 6/2017 | Dukat ..................... | B02C 18/18 |
| 9,730,554 | B2* | 8/2017 | Chan ....................... | B02C 18/08 |
| 9,757,733 | B1* | 9/2017 | Dukat ..................... | A47J 42/40 |
| 10,455,984 | B1* | 10/2019 | Abehasera .............. | A47J 42/50 |
| 2013/0214068 | A1* | 8/2013 | Camitta .................. | B02C 18/24 |
| | | | | 241/25 |

(Continued)

*Primary Examiner* — Faye Francis
(74) *Attorney, Agent, or Firm* — Chad D. Tillman; Tillman Wright, PLLC

(57) ABSTRACT

A container when assembled includes a body, a cover, a lower grinding component, and an upper grinding component. The body includes a primary storage area compartment, the lower grinding component includes a grinding area compartment, and the upper grinding component includes a secondary storage area compartment. The upper grinding component partially nests within the lower grinding component. The lower grinding component defines a recess comprising the grinding area compartment. The upper grinding component is inserted into and partially received within the recess of the lower grinding component to form a grinder. The lower grinding component partially nests within the body of the container and the cover fits over the upper grinding component and partially over the lower grinding component when the cover is secured to the body of the grinder, whereby the grinder is completely enclosed within the body and cover of the container.

19 Claims, 16 Drawing Sheets

(56) References Cited

U.S. PATENT DOCUMENTS

| | | | |
|---|---|---|---|
| 2017/0135524 A1* | 5/2017 | Moneta | B02C 23/10 |
| 2017/0245541 A1* | 8/2017 | Pagan | A47J 42/34 |
| 2018/0126386 A1* | 5/2018 | Witko | B02C 18/16 |
| 2020/0390284 A1* | 12/2020 | Griffin | A47J 42/14 |
| 2020/0390285 A1* | 12/2020 | Galaviz | A47J 42/24 |
| 2021/0107111 A1* | 4/2021 | Kick | A47J 43/04 |
| 2021/0127901 A1* | 5/2021 | Krasnopolskiy | A24B 7/04 |

* cited by examiner

CONTAINER

COPYRIGHT STATEMENT

Any new and original work of authorship in this document is subject to copyright protection under the copyright laws of the United States and other countries. Reproduction by anyone of this document as it appears in official governmental records is permitted, but otherwise all other copyright rights whatsoever are reserved.

BACKGROUND OF THE INVENTION

The invention generally relates to a container that stores organic material and is configured to grind the organic material. More particularly, the invention relates to a container within which a grinder defining a grinding area compartment is contained wherein, the container comprises two separate storage area compartments for containing organic material, neither one of which is the grinding area compartment. The organic material may comprise, for example and not by way of limitation, foliage such as leaves or flowers, such as lavender flowers.

U.S. Reissue Pat. No. 46,408 discloses such a container and appears to be suited for its intended purpose. The prior art container of this reissue patent is adapted and suited for storing, grinding and pouring organic material. This prior art container comprises a cap that is attachable to a base cup, and a storage receptacle that is sized and configured to be disposed and nested between the cap and the cup. The storage receptacle resides within and is encapsulated between the cap and the cup and serves to store organic material prior to grinding. The cap is lockable onto the cup with the storage receptacle secured within the interior space of the cap and cup. The container is molded from a plastic material so as to be light in weight and inexpensive to manufacture.

Importantly, the storage receptacle is rotatable relative to the cup and includes a first set of grinding elements located on an exterior bottom thereof. The cup includes a second set of grinding elements on an interior bottom thereof. When the storage receptacle is rotated relative to the cup, organic material placed between the cup and storage receptacle are ground by the first and second sets of grinding elements. After a desired amount of grinding, the storage receptacle is withdrawn from the cup, and the cup is used to pour out the ground organic material.

It will be appreciated that an immediately shortcoming of this prior art container is the lack of a secondary storage area compartment that can be used to store the ground organic material and that is different from the primary storage area compartment for storing the unground organic material. It would further be beneficial to be able to simply pour ground organic material into such a secondary storage area compartment.

One or more preferred embodiments of the invention are believed to meet such a need.

SUMMARY OF THE INVENTION

The invention includes many aspects and features. Moreover, while many aspects and features relate to, and are described in, the context of containers for organic material, the invention is not limited to use only in such context and may find utility, for example, in the context of containers for other materials to be contained and ground.

Accordingly, in an aspect of the invention, a container when assembled includes a body, a cover, and a grinder. The body defines a primary storage area compartment, and the grinder defines both a grinding area compartment and a secondary storage area compartment.

In a feature, the grinder further comprises a lid that closes off the secondary storage area compartment.

In a feature, the primary storage area compartment is larger than the secondary storage area compartment.

In a feature, the grinder is completely enclosed within the container when the cover is secured to the body.

In a feature, the cover is tethered to the body.

In a feature, the cover is tethered to the body by a strap.

In a feature, the cover comprises threads on an inner surface thereof—and the container comprises corresponding threads on an outer surface of a rim of the body—by which the cover screws onto the body of the container.

In a feature, the cover forms an airtight engagement with the body.

In a feature, the cover forms a watertight engagement with the body.

In a feature, the cover and body of the container are configured to provide for primary storage without the presence of the grinder; and the grinder is configured to provide grinding and secondary storage in the absence of the cover and the body.

In another aspect, a container when assembled includes a body, a cover, and a lower grinding component and an upper grinding component. The body comprises a primary storage area compartment, the lower grinding component comprises a grinding area compartment, and the upper grinding component comprises a secondary storage area compartment.

In a feature, the upper grinding component partially nests within the lower grinding component.

In a feature, the lower grinding component comprises a recess comprising the grinding area compartment. The upper grinding component is inserted into and partially received within the recess of the lower grinding component to form a grinder.

In a feature, the lower grinding component partially nests within the body of the container and the cover fits over the upper grinding component and partially over the lower grinding component when the cover is secured to the body of the grinder, whereby the grinder is completely enclosed within the body and cover of the container.

In a feature, the lower grinding component comprises a first plurality of grinding elements located on a bottom interior surface thereof in the form of spaced apart protuberances comprising grinding teeth; the upper grinding component comprises a second plurality of grinding elements located on a bottom exterior surface thereof in the form of spaced apart protuberances comprising grinding teeth; and the teeth of the lower grinding component are configured to extend adjacent the teeth of the upper grinding component when the upper grinding component is received within the lower grinding component to form the grinder.

In a feature, the lower grinding component comprises a bottom interior surface that is contoured to form recesses therein; the upper grinding component comprises a bottom exterior surface that is contoured to form recesses therein. The recesses preferably are concave.

In a feature, the lower grinding component is secured to the body of the container by a threaded connection.

In a feature, the lower grinding component comprises threads on an outer surface thereof—and the container comprises corresponding threads on an inner surface of a rim of the body—by which the lower grinding component screws onto the body of the container.

In a feature, the container minimizes or eliminates odors emanating from the container by providing airtight seals between the cover and the body of the container; and between the lid and the inner wall of the upper grinding component that defines the secondary storage area compartment.

In another feature, the cover and the body of the container cooperatively form a locking mechanism for removably locking the cover onto the rim. Such a locking mechanism is disclosed, for example, in U.S. Reissue Pat. No. 46,408, which is incorporated herein for such disclosure pertaining to a locking mechanism. This reissue patent further is incorporated herein by reference for two additional features, including disclosure of alternative forms of grinding elements, including for example teeth with facets; and disclosure of alternative gripping surfaces for manual gripping for rotation of one or more components of the container.

In another aspect, a container when assembled, comprising: a body, a cover, and a first grinding component and a second grinding component. The body comprises a primary storage area compartment, the first grinding component comprises a grinding area compartment, and the second grinding component comprises a secondary storage area compartment.

In a feature, the second grinding component is partially received within the first grinding component, and the first grinding component is partially received within the body of the container.

In addition to the foregoing aspects and features of the invention, it should be noted that the invention further encompasses the various logical combinations and subcombinations of such aspects and features. Thus, for example, claims in this or a divisional or continuing patent application or applications may be separately directed to any aspect, feature, or embodiment disclosed herein, or combination thereof, without requiring any other aspect, feature, or embodiment.

BRIEF DESCRIPTION OF THE DRAWINGS

One or more preferred embodiments of the invention now will be described in detail with reference to the accompanying drawings, wherein the same elements are referred to with the same reference numerals.

DETAILED DESCRIPTION

Figure 1:
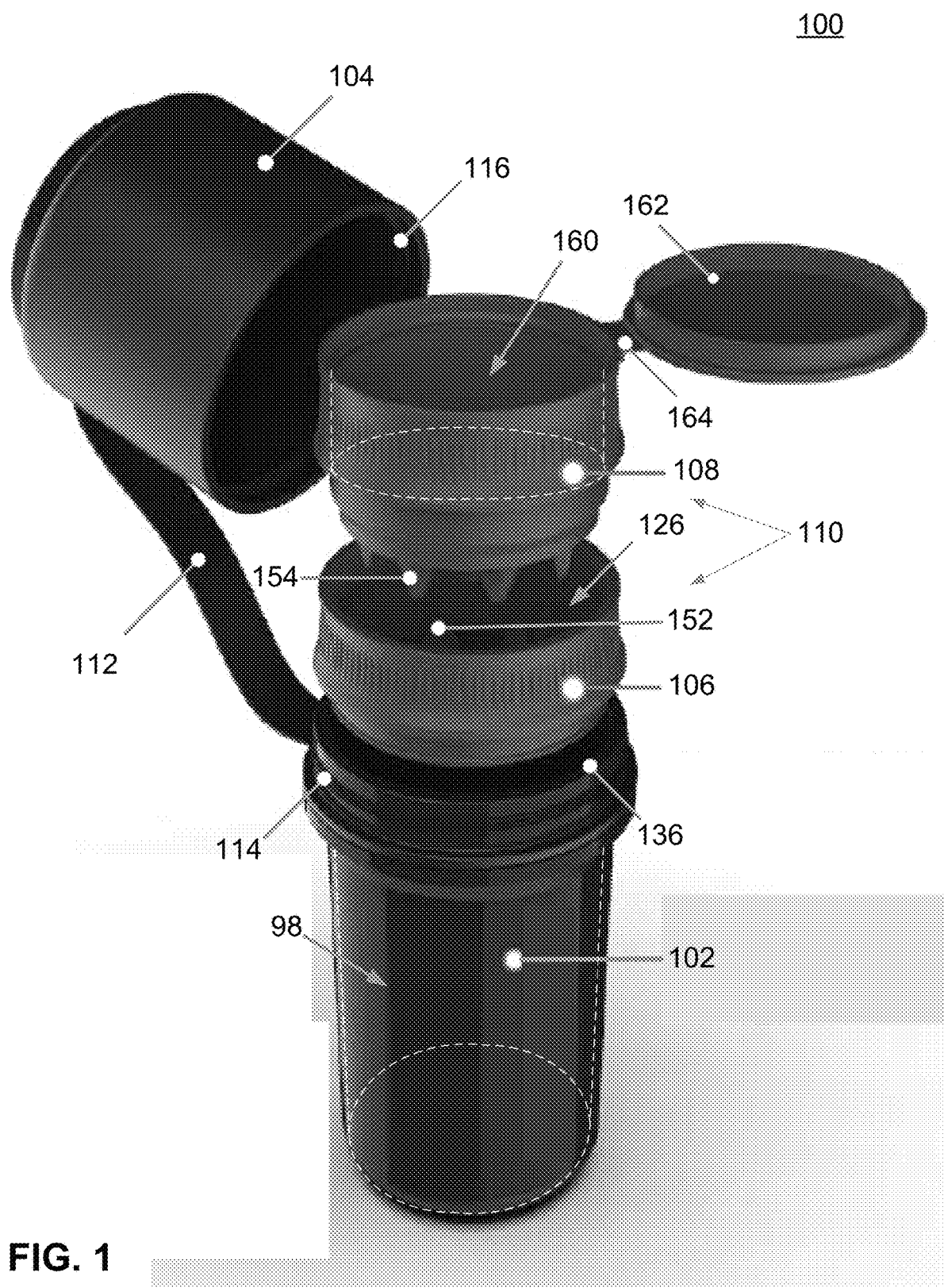
FIG. 1 is a perspective, exploded view of a preferred embodiment of a container in accordance with one or more aspects and features of the invention, wherein the components thereof are separated for illustration.

As a preliminary matter, it will readily be understood by one having ordinary skill in the relevant art ("Ordinary Artisan") that the invention has broad utility and application. Furthermore, any embodiment discussed and identified as being "preferred" is considered to be part of a best mode contemplated for carrying out the invention. Other embodiments also may be discussed for additional illustrative purposes in providing a full and enabling disclosure of the invention. Furthermore, an embodiment of the invention may incorporate only one or a plurality of the aspects of the invention disclosed herein; only one or a plurality of the features disclosed herein; or combination thereof. As such, many embodiments are implicitly disclosed herein and fall within the scope of what is regarded as the invention.

Accordingly, while the invention is described herein in detail in relation to one or more embodiments, it is to be understood that this disclosure is illustrative and exemplary of the invention and is made merely for the purposes of providing a full and enabling disclosure of the invention. The detailed disclosure herein of one or more embodiments is not intended, nor is to be construed, to limit the scope of patent protection afforded the invention in any claim of a patent issuing here from, which scope is to be defined by the claims and the equivalents thereof. It is not intended that the scope of patent protection afforded the invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the invention. Accordingly, it is intended that the scope of patent protection afforded the invention be defined by the issued claim(s) rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

With regard solely to construction of any claim with respect to the United States, no claim element is to be interpreted under 35 U.S.C. 112(f) unless the explicit phrase "means for" or "step for" is actually used in such claim element, whereupon this statutory provision is intended to and should apply in the interpretation of such claim element. With regard to any method claim including a condition precedent step, such method requires the condition precedent to be met and the step to be performed at least once during performance of the claimed method.

Furthermore, it is important to note that, as used herein, "comprising" is open-ended insofar as that which follows such term is not exclusive. Additionally, "a" and "an" each generally denotes "at least one" but does not exclude a plurality unless the contextual use dictates otherwise. Thus, reference to "a picnic basket having an apple" is the same as "a picnic basket comprising an apple" and "a picnic basket including an apple", each of which identically describes "a picnic basket having at least one apple" as well as "a picnic basket having apples"; the picnic basket further may contain one or more other items beside an apple. In contrast, reference to "a picnic basket having a single apple" describes "a picnic basket having only one apple"; the picnic basket further may contain one or more other items beside an apple. In contrast, "a picnic basket consisting of an apple" has only a single item contained therein, i.e., one apple; the picnic basket contains no other item.

When used herein to join a list of items, "or" denotes "at least one of the items" but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers"; the picnic basket further may contain one or more other items beside cheese and crackers.

When used herein to join a list of items, "and" denotes "all of the items of the list". Thus, reference to "a picnic basket having cheese and crackers" describes "a picnic basket having cheese and crackers, wherein the picnic basket further has crackers", as well as describes "a picnic basket having crackers, wherein the picnic basket further has cheese"; the picnic basket further may contain one or more other items beside cheese and crackers.

Referring now to the drawings, one or more preferred embodiments of the invention are next described. The following description of one or more preferred embodiments is merely exemplary in nature and is in no way intended to limit the invention, its implementations, or uses.

Figure 2:
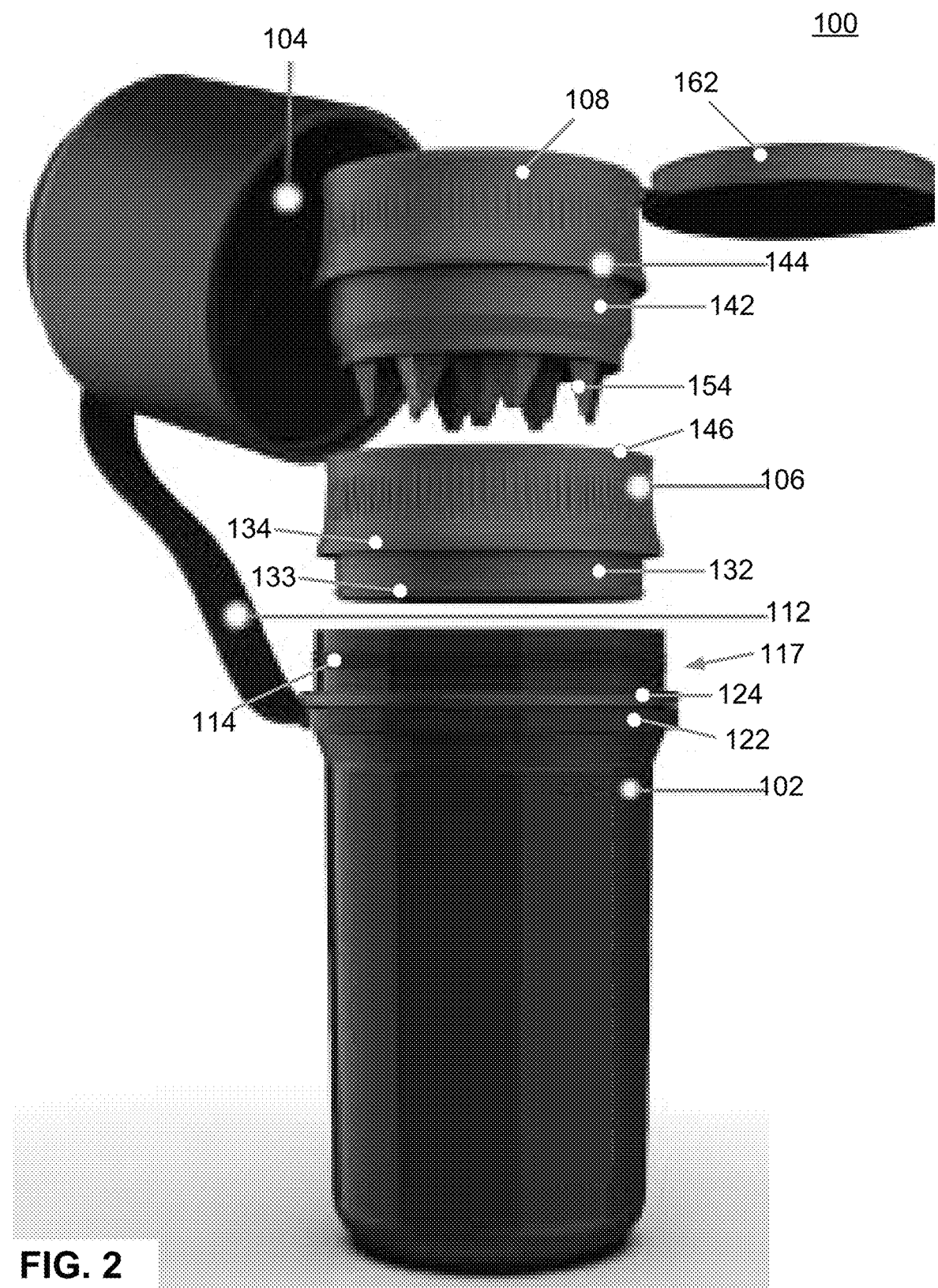
FIG. 2 is another perspective, exploded view of the container of FIG. 1, wherein the components thereof also are separated for illustration.
Figure 3:
FIG. 3 is a side view of the container of FIG. 1, wherein the components are assembled together, and the container is closed.
Figure 4:
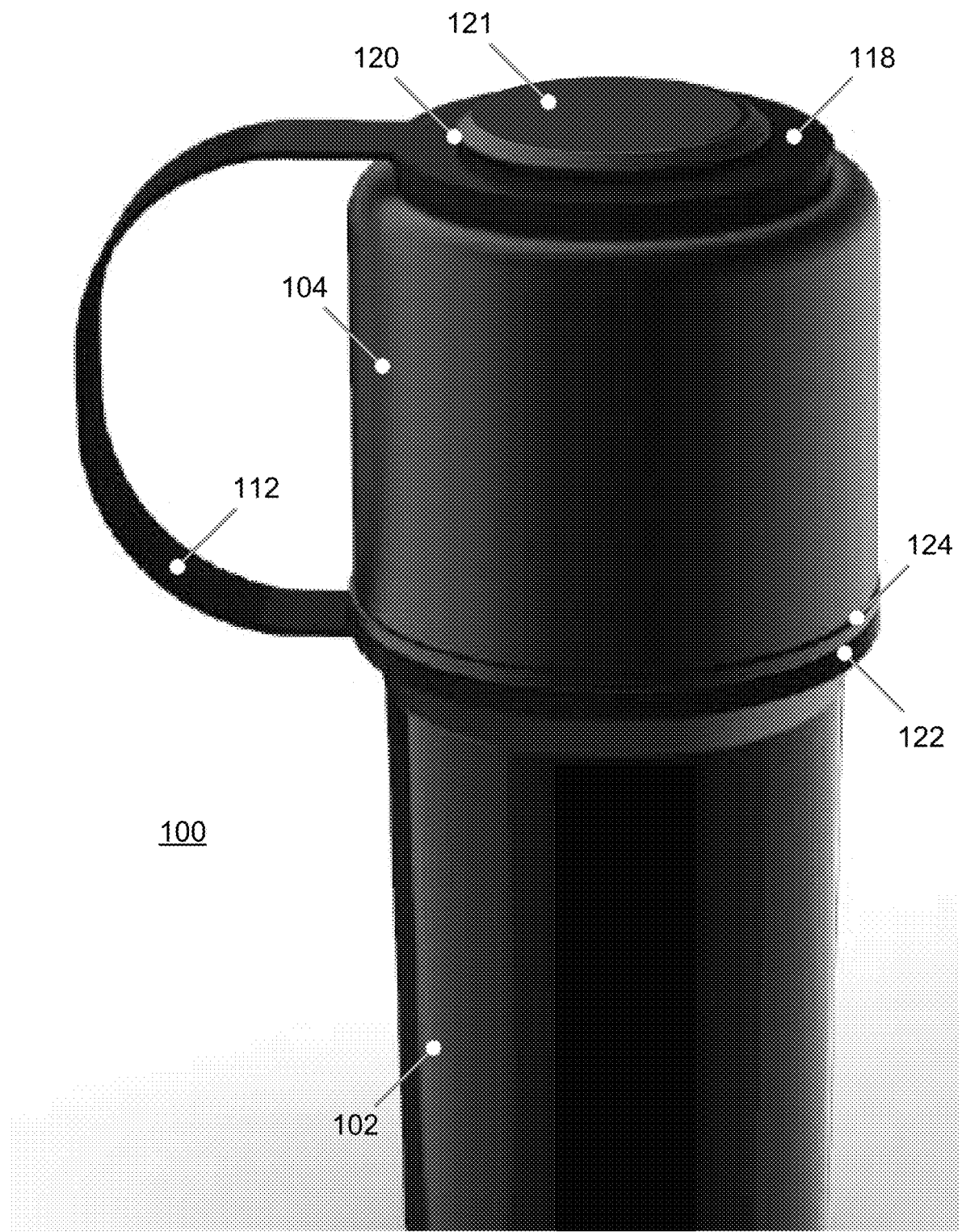
FIG. 4 is a partial perspective view of the container of FIG. 1, wherein the components also are assembled together, and the container also is closed.
Figure 5:
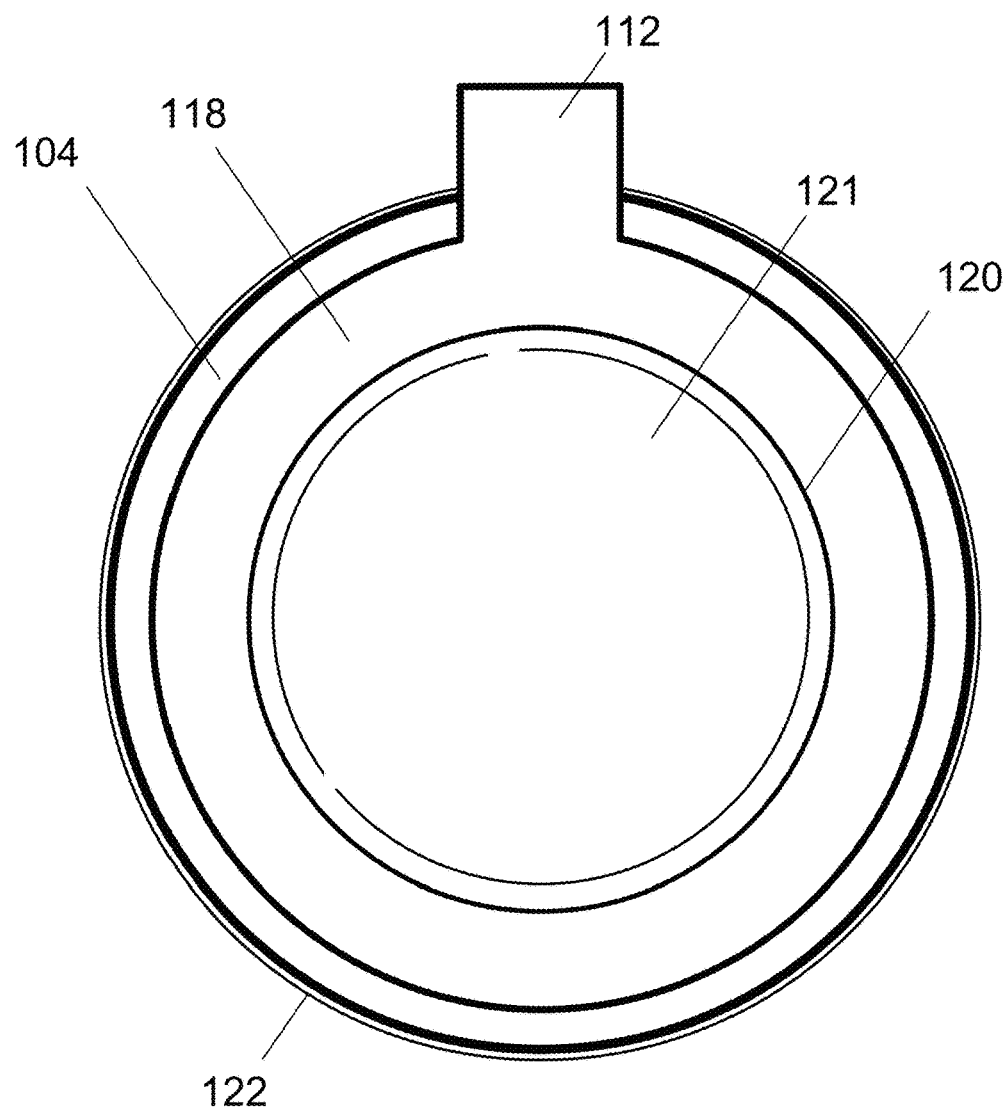
FIG. 5 is a top plan view of the container of FIG. 1, wherein the components are assembled together, and the container is closed.

FIGS. 1 and 2 are perspective, exploded views of a preferred embodiment of a container 100 in accordance with one or more aspects and features of the invention. FIGS. 3 and 4 are side views of the container of FIG. 1, wherein the components are assembled together, and the container 100 is closed. FIG. 5 is a top plan view of the container 100, wherein the components are assembled together, and the container 100 is closed.

With reference to FIGS. 1 and 2, the components of the container 100 are shown separated apart from one another for clarity. The components of the container 100 comprise a body 102 and a cover 104. The cover 104 is tethered to the body by a strap 112. The components of the container further include a grinder 110. The grinder 110 itself comprises two components, namely, a lower grinding component 106 and an upper grinding component 108.

The body 102 of the container 100 defines a primary storage area compartment 98 for receiving, containing, and storing organic material, which is schematically illustrated in phantom in FIG. 1. The body 102 preferably is formed from glossy polypropylene that has UV-blocking additives.

The cover 104 comprises threads 116 on an inner surface thereof, and the container comprises corresponding threads 114 on an outer surface of a rim 117 of the body 102, by which the cover 104 screws onto the body 102 of the container 100. The cover 104 preferably screws on in an airtight engagement so that the storing of the organic material within the storage area compartment 98 is odorless. The cover 104 preferably is formed from textured polypropylene that has UV-blocking additives.

Preferably, the strap 112 connects to the cover 104 by way of a ring 118 that snap-fits over a circular flange 120 on the top 121 of the cover 104. The top 121 preferably is beveled for facilitating the snap-fitting of the ring 118 over the flange 120.

Similarly, the strap 112 connects to the body 102 by way of a larger ring 122 that snap-fits over a flange 124 of a rim 117 of the body 102 and fits within a peripheral channel defined in the outer surface of the body 102. The cover 104 thus rotates relative to the smaller ring 118, and the body 102 rotates relative to the larger ring 122. Preferably, the strap 112 and the two rings 118,122 consist of a single piece of molded plastic, and the strap 112 preferably is formed from textured polypropylene that has UV-blocking additives. The strap 112 also preferably is removable by a user by pulling the rings 118,122 respectively from the flanges 120,124.

In some alternative embodiments, the strap is integrally molded with the body and the cover such that the strap, body, and cover consist of a single piece of molded plastic, with the cover snap-fitting over and onto the rim of the body.

The lower grinding component 106 comprises a cylindrical wall 132 configured to circumferentially engage in frictional fit an interior wall that defines a mouth of the body 102 leading into the storage area compartment 98 proximate to and surrounded by the rim 117. The cylindrical wall 132 also includes a lip 133 extending around the bottom edge of the wall 132 for sealing engagement with the interior wall of the mouth of the body 102 proximate to and surrounded by the rim 117. The sealing engagement preferably is airtight and watertight. The lower grinding component 106 further includes a peripheral portion that radially flares out to define a flange 134 for engaging and resting upon a top surface 136 of the rim 117. The lower grinding component 106 preferably is formed from textured polypropylene that has UV-blocking additives.

The upper grinding component 108 also includes a cylindrical wall 142 configured to circumferentially engage in frictional fit an interior wall that defines a mouth of the lower grinding component 106 leading to a grinding area compartment 126, which grinding area compartment is surrounded by the cylindrical wall 132. The upper grinding component 108 further includes a peripheral portion that radially flares out to define a flange 144 for engaging and resting upon the top of a rim 146 of the lower grinding component 106 that surrounds the mouth leading to the grinding area compartment 126. The upper grinding component 108 preferably is formed from textured polypropylene that has UV-blocking additives.

Figure 8:
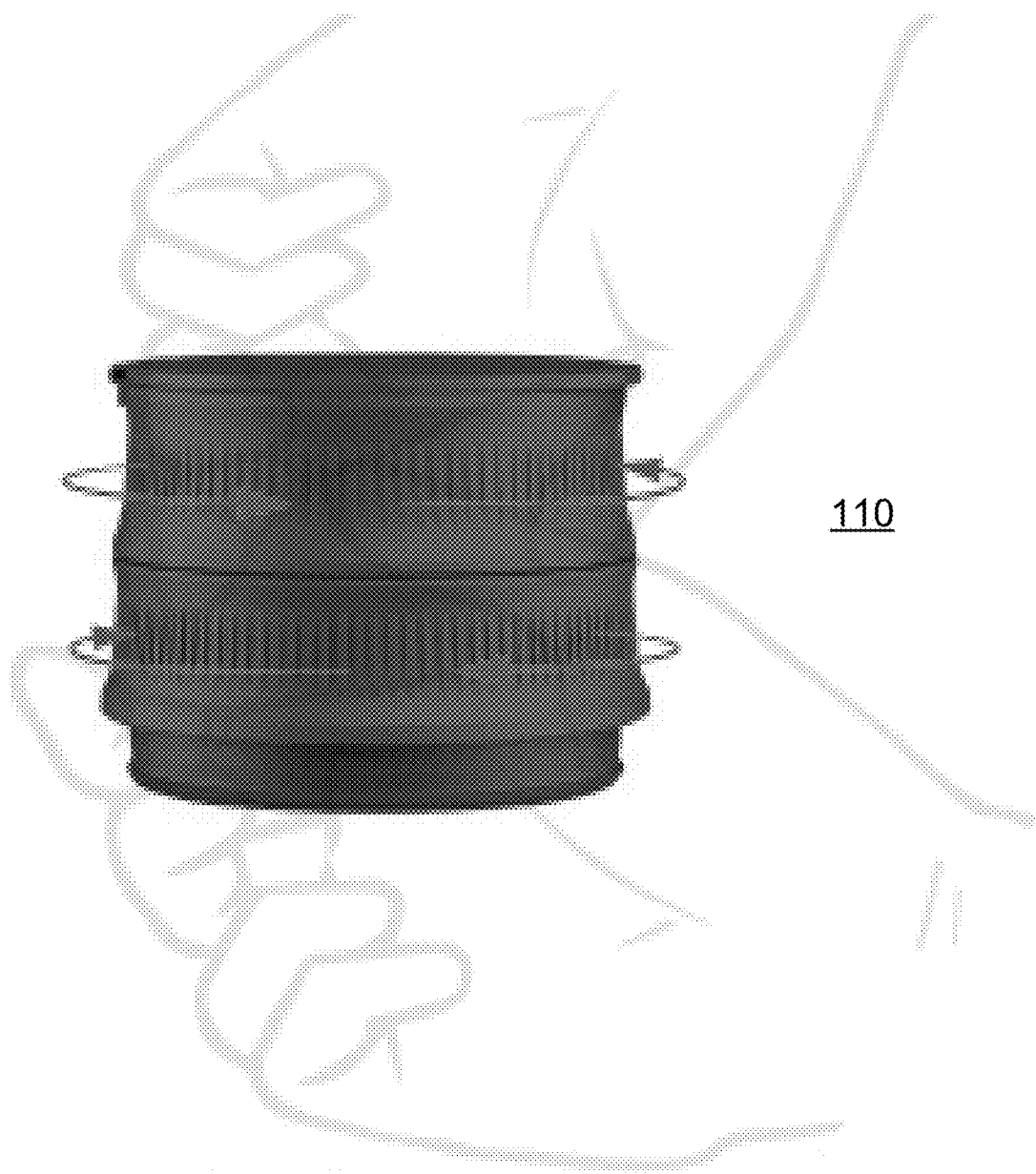
FIG. 8 is a side view of the grinder of FIG. 7 showing relative rotation of the lower grinder component and upper grinder component, by which the lavender flower placed in the grinding area compartment is ground.

The lower grinding component 106 defining the grinding area compartment 126 includes a first plurality of grinding elements located on a bottom interior surface thereof in the form of spaced apart protuberances comprising grinding teeth 152, and the upper grinding component 108 comprises a second plurality of grinding elements located on a bottom exterior surface thereof in the form of spaced apart protuberances comprising grinding teeth 154. The teeth 152 are configured to extend adjacent the teeth 154 when the upper grinding component is inserted into the lower grinding component as seen, for example, in FIGS. 6 and 8. The teeth 152,154 operate to grind organic material that is received within the grinding area compartment 126 during rotational movement between the upper and lower grinding components, which movement is schematically illustrated in FIG. 8.

To facilitate manual gripping for such rotation, a portion of the exterior surface of the lower grinding component 106 comprises a gripping surface 156 in the form of ridges, and a portion of the exterior surface of the upper grinding component 108 comprises a gripping surface 158 in the form of ridges. The gripping surface 156 extends circumferentially around the lower grinding component 106, and the griping surface 158 circumferentially around the upper grinding component 108.

After grinding, the ground organic material is poured from the grinding area compartment 126 using the lower grinding component 106 as a pouring cup. The ground organic material can be poured using the lower grinding component 106 in a controlled manner. When the organic material is tobacco, for example, the ground tobacco can be poured from the lower grinding component 106 into a pipe, or onto smoking paper for rolling into a cigarette.

The upper grinding component 108 also comprises a secondary storage area compartment 160, which can be used for storing ground organic material. Indeed, following grinding the lower grinding component 106 can function as a pouring cup for pouring the ground organic material from the grinding area compartment 126 into the secondary storage area compartment 160 of the upper grinding component 108. A lid 162 connected by a hinge 164 to a peripheral wall of the upper grinding component 108 can be used to cover and close off the secondary storage area compartment 160. The lid 162 preferably forms a seal with the peripheral wall of the upper grinding component 108 that is airtight for odorless storage of ground organic material in the secondary storage area compartment 160. Preferably, the seal is formed by a frictional fit of a peripheral wall 168 of the lid 162 being received in tight fit with the inner surface of the peripheral wall 170 of the upper grinding component 108. An inner peripheral shoulder also extends around the inner surface of the peripheral wall 170 of the upper grinding component 108 that acts as a stop to further advancement of the wall 168 of the lid into the secondary storage area compartment 160. The lid 162 further includes a tab 180 for manual opening of the lid 162 for access to the secondary storage area compartment 160.

Figure 6:
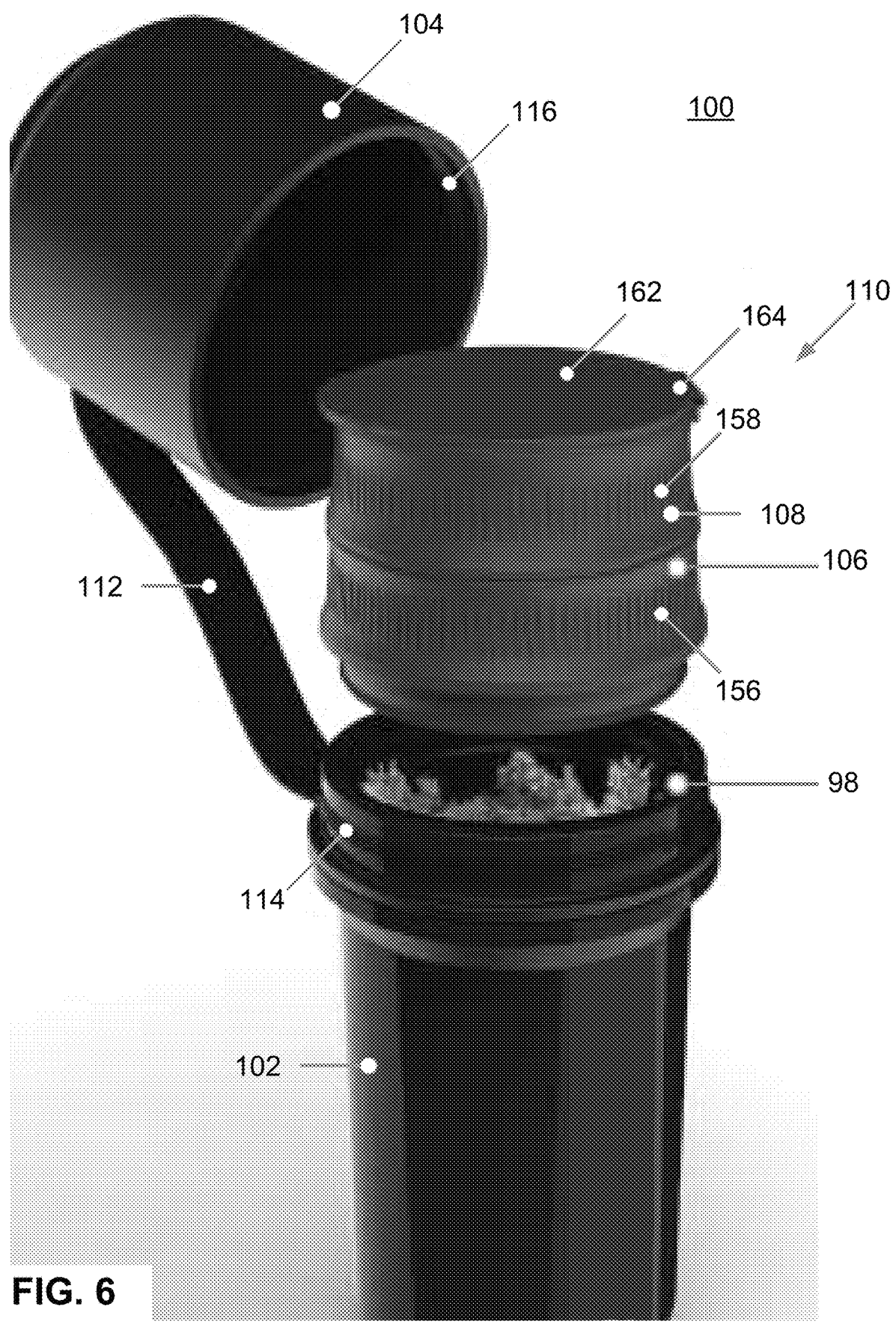
FIG. 6 is a perspective view of the container of FIG. 1, partially exploded.

In use, the primary storage area compartment 98 serves as primary storage of the container 100 for storing organic material for later grinding. To grind the organic material, the cover 104 is unscrewed and removed from the body of the container to expose the grinder 110. The grinder 110 then is removed, either as a whole or by first removing the upper grinding component 108 and then removing the lower grinding component 106. This step is represented by FIG. 6. Removal of the grinder 110 then enables access to the primary storage. As seen in FIG. 6, removing the grinder 110 exposes the unground organic material comprising the lavender flowers contained in the primary storage area compartment 98.

Figure 7:
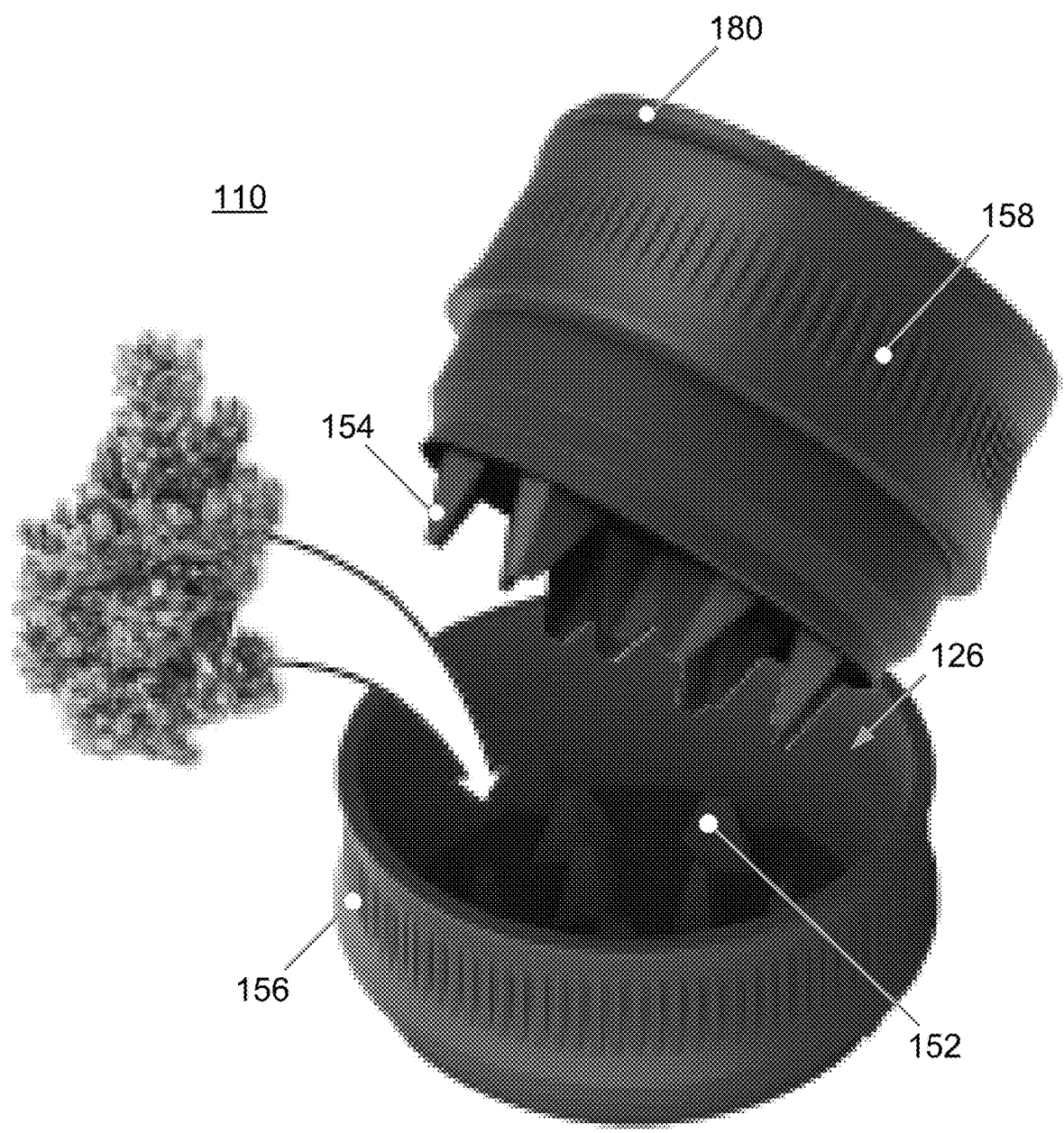
FIG. 7 is a perspective, exploded view of the grinder of the container of FIG. 1, wherein lavender flower is illustrated being placed into the grinding area compartment of the lower grinder component.

A desired amount of the organic material for grinding then is removed from the primary storage area compartment 98 and placed in the grinding area compartment 126. This step is represented by FIG. 7, where the upper and lower grinding components are separated to expose the grinding area compartment 126.

Once the organic material to be ground has been received in the grinding area compartment 126, the upper grinding component is inserted into the lower grinding component and the two components are rotated by hand relative to each other to effect grinding of the organic material. This step is schematically illustrated in FIG. 8.

Following a desired degree of grinding, the upper grinding component 108 is withdrawn from the lower grinding component 106 to expose the ground organic material in the grinding area compartment 126 of the lower grinding component 106. The ground organic material is then used as desired in any lawful manner. In such use, the lower grinding component preferably serves as pouring cup for pouring of the ground organic material.

Figure 9:
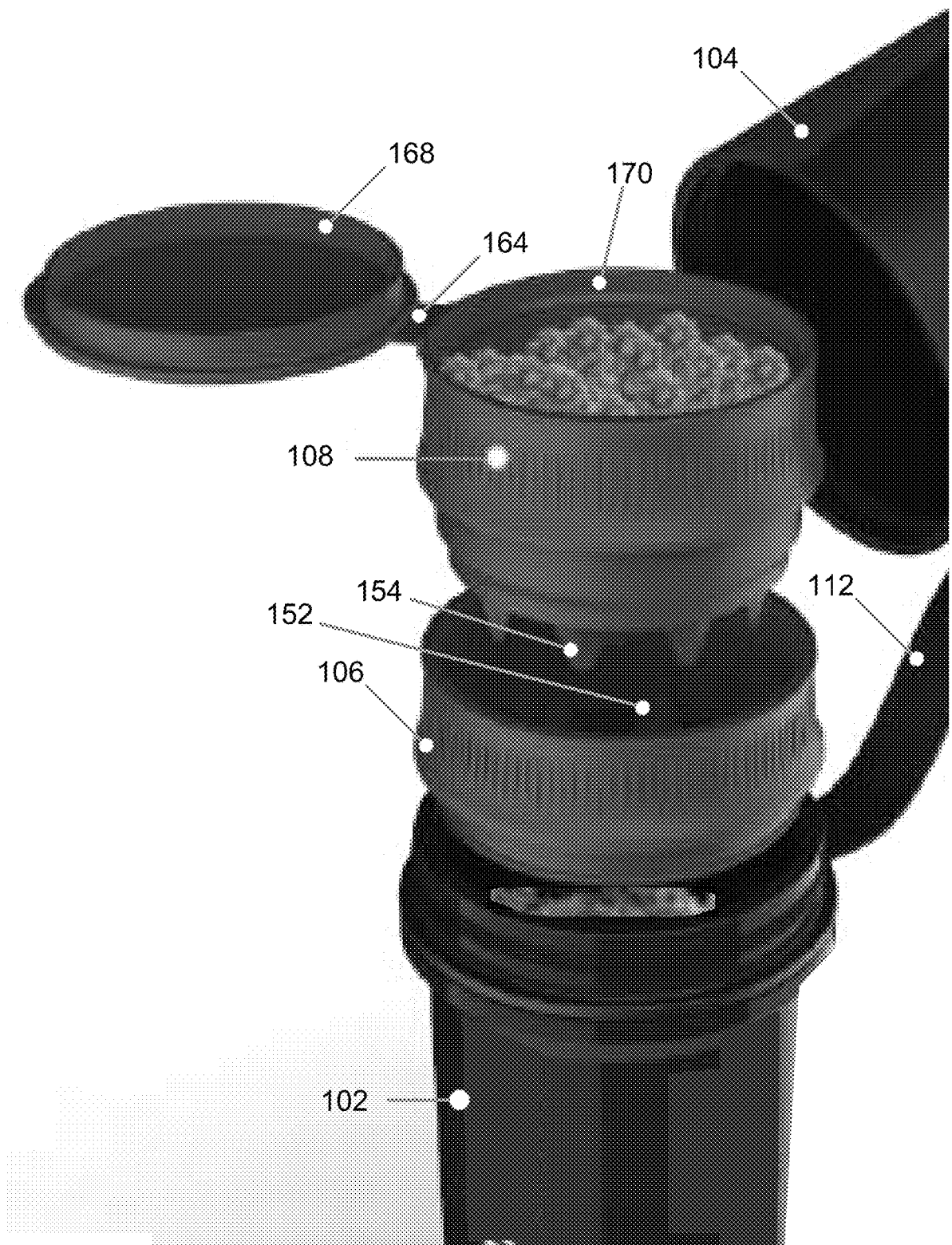
FIG. 9 is a partial perspective, exploded view of the container of FIG. 1, wherein unground lavender flower is seen in the container and ground lavender flower is seen in the secondary storage of the upper grinder component.

It may be the case that too much organic material has been ground and should be saved for later use rather than being discarded. The container 100 makes saving of the ground organic material convenient and easy. The lid 162 is popped off or otherwise opened, and the unused ground material is poured from the lower grinding component into the secondary storage area compartment 160 of the upper grinding component. FIG. 9 illustrates unground lavender flowers contained in the primary storage 98 of the body 102 of the container 100, and ground lavender flowers contained in the secondary storage 126 of the upper grinding component 108.

At this stage the lid 162 can be closed with the ground lavender flowers contained in the secondary storage of the upper grinding component 108; the lower grinding component 106 can be inserted into the mouth of the body 102 of the container 100; the upper grinding component 110 can be inserted into the mouth of the lower grinding component 106; the cover 102 can be screwed onto the rim 117 of the body 102 of the container 100 for sealing the grinding component 110, whereby the unground lavender flowers are contained within the primary storage in an airtight manner, and the ground lavender flowers are contained within the secondary storage in an airtight manner.

It will be appreciated that a container in accordance with one or more aspects and features of the invention can be made in a variety of sizes, but preferred sizes correspond to something a bit larger than a medicine pill bottle or film canister or the like. Such container preferably is of a size that can be easily carried on one's person whether in one's pants or shorts pocket, purse, or the like, and the components thereof preferably are molded from plastic materials such that the container is light in weight and inexpensive to manufacture. Additionally, while the components of the container are illustrated as being generally cylindrical, it will be appreciated that other shapes, such as a multi-faceted design, can be used so long as the grinder fits within the confines of the body and cover of the container when the container is assembled and closed.

Figure 10:
FIG. 10 is a side view of another preferred embodiment of a container in accordance with one or more aspects and features of the invention, wherein the components thereof are assembled together, and the container also is closed.

FIG. 10 is a side view of another preferred embodiment of a container 200 in accordance with one or more aspects and features of the invention. As seen in FIG. 10, the container 200 fits within a person's hand, extending from the little finger to the thumb when gripped.

Figure 11:
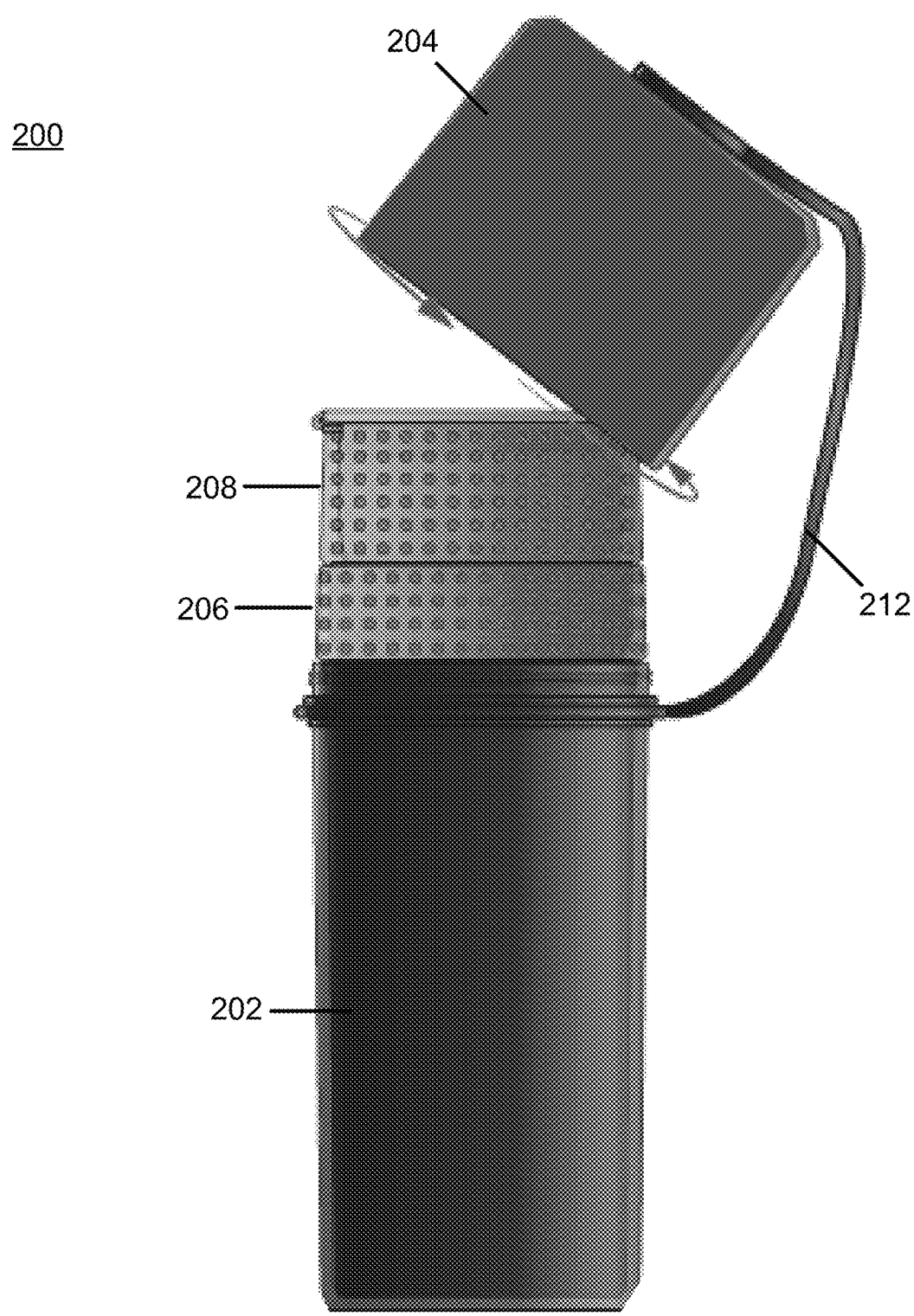
FIG. 11 is another side view of the container of FIG. 10, wherein unscrewing and removal of the cover from the body of the container is illustrated.
Figure 12:
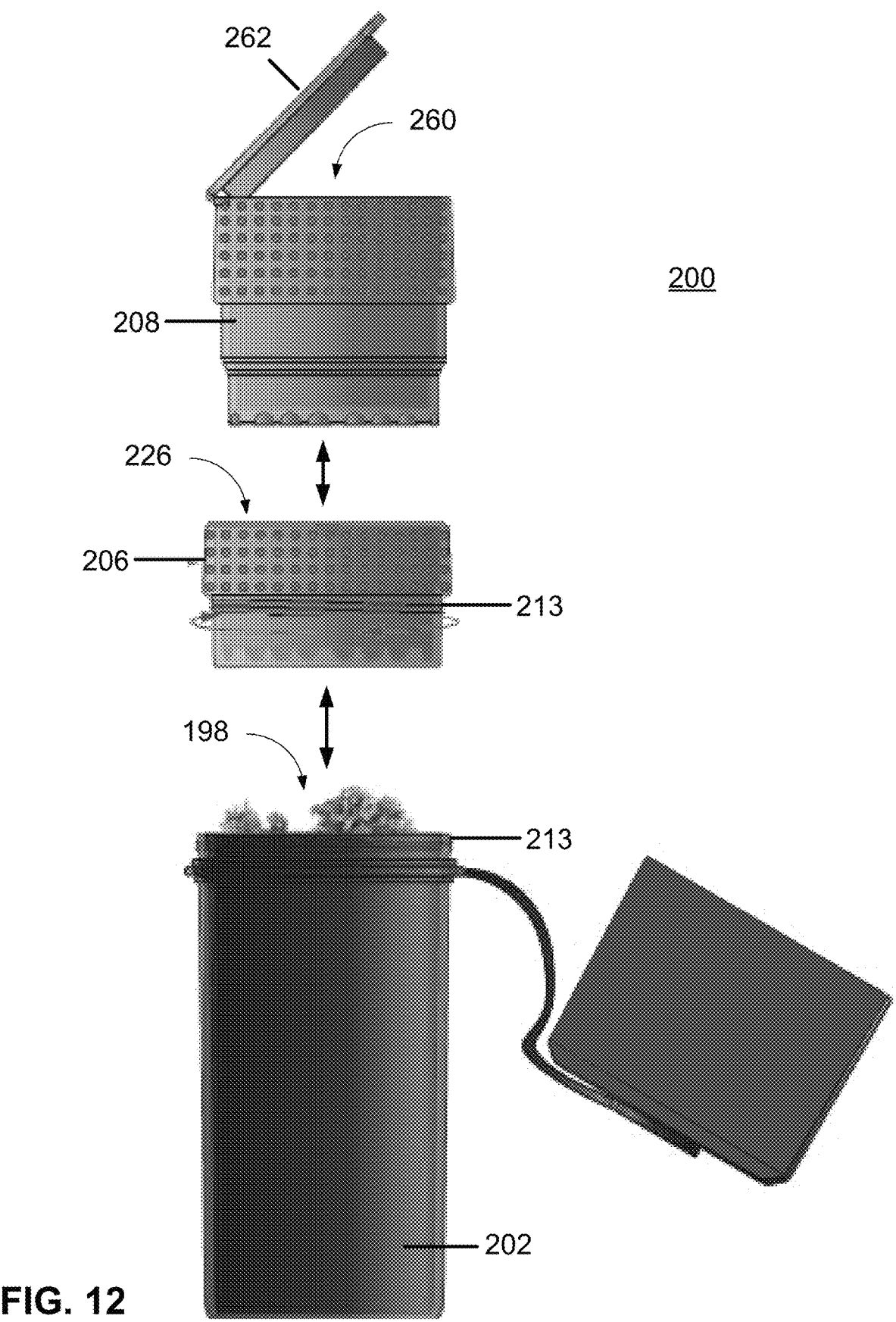
FIG. 12 is a side exploded view of the container of FIG. 10, wherein unscrewing of the lower grinding component from the body of the container is illustrated, and wherein unground lavender flower is seen being stored in the storage area compartment of the body of the container.

FIG. 11 is another side view of the container 200, and FIG. 12 is a side exploded view of the container 200. As seen in FIG. 11, the container 200 comprises a body 202 and a cover 204 that is tethered to the body 102 by a strap 212. The cover 204 unscrews from a rim of the body 202, and a grinder comprising lower grinding component 206 and upper grinding component 208 is encapsulated within the container when the cover 204 is secured onto the rim of the body 202. The upper grinding component 208 defines a secondary storage area compartment that is closed by a lid 216 utilizing a hinge.

The structure and use of the container 200 is like the container 100 discussed in detail above. Consequently, the following description focuses on differences between container 100 and container 200.

FIG. 12 is a side exploded view of the container 200. As revealed in FIG. 12, the lower grinding component 206 unscrews from the body 202 of the container 200, and unground lavender flower is seen contained within the primary storage area compartment 198, i.e., the storage area compartment of the body of the container. The threads 213 seen on the lower grinding component in FIG. 12 mate with threads on an interior surface of the rim 217 of the body 202 of the container 200. Accessing the primary storage of the container 202 thus is accomplished by twisting or unscrewing the lower grinding component 206 off of the rim 217 of the body 202 of the container 200 after the cover 204 is unscrewed and moved away from the body 202 of the container 200. The use of a threaded connection to secure the lower grinding component 206 to the body 202 of the container 200 is a difference from the frictional fit utilized between the lower grinding component 106 and the body 102 of the container 100.

Figure 13:
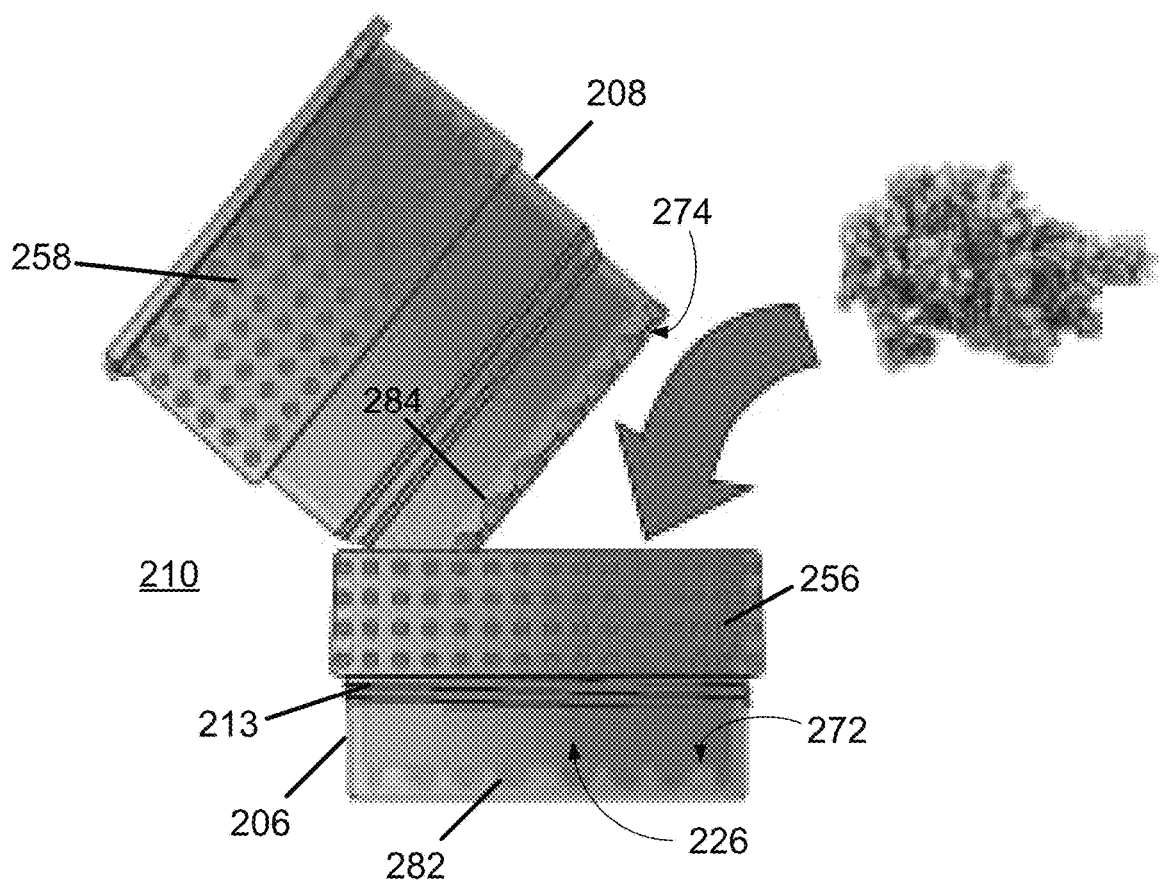
FIG. 13 is a perspective, exploded view of the grinder of the container of FIG. 10, wherein lavender flower is illustrated being placed into the grinding area compartment of the lower grinder component.
Figure 14:
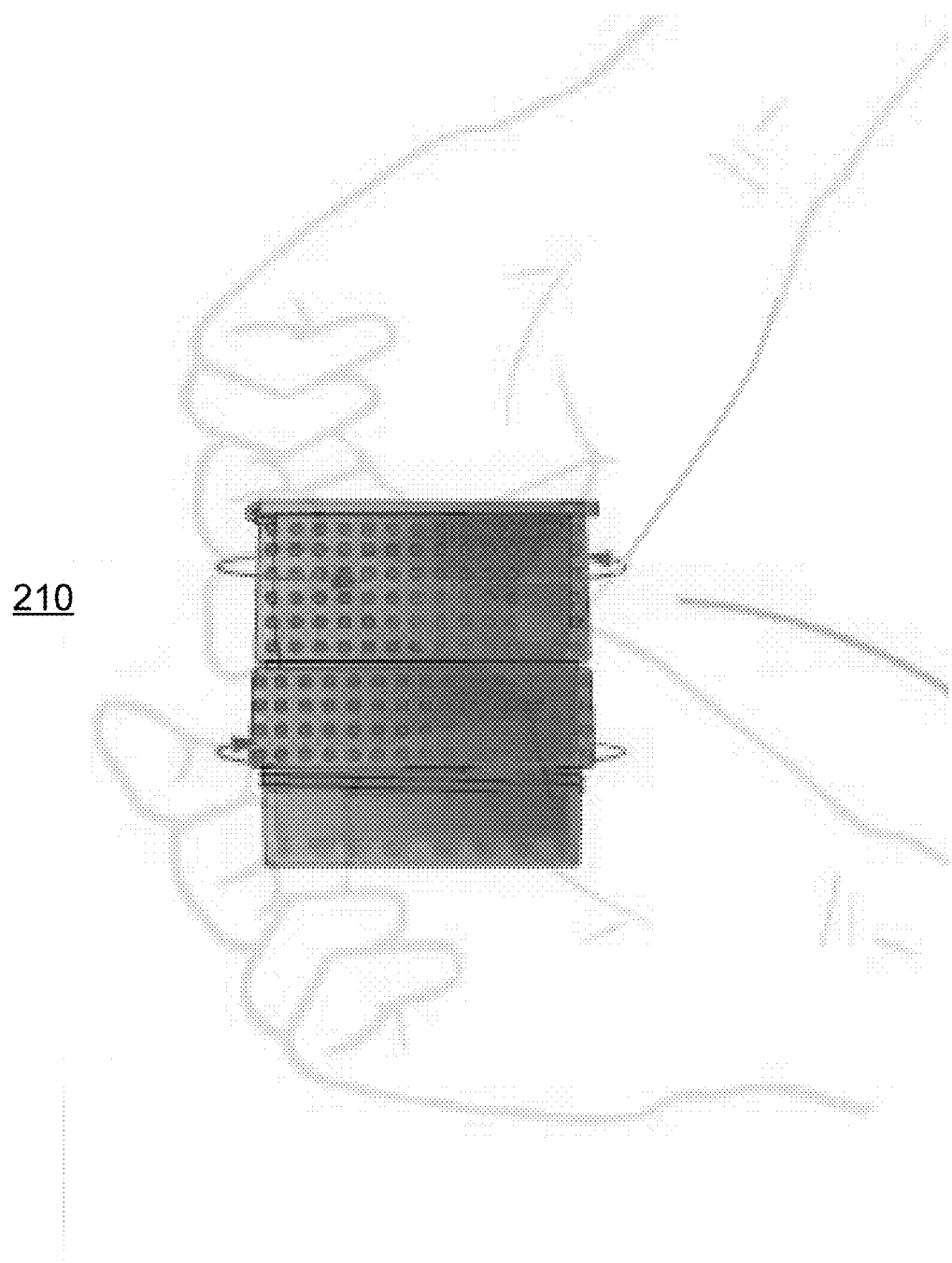
FIG. 14 is a side view of the grinder of FIG. 13 showing relative rotation of the lower grinder component and upper grinder component, by which the lavender flower placed in the grinding area compartment is being ground.

FIG. 13 is a perspective, exploded view of the grinder of the container 200. As illustrated in FIG. 13, lavender flower is being placed through a mouth of the lower grinding component and into the grinding area compartment 226 of the lower grinder component 206 for grinding. The lower portion of the upper grinding component 208 fits into the grinding area compartment 226 of the lower grinding component 206, as seen in FIG. 14. As further seen in FIG. 14, relative rotation of the lower grinder component 206 and the upper grinder component 208 is then manually performed, by which the lavender flower placed within the grinding area compartment 226 is ground.

To facilitate manual gripping for such rotation, a portion of the exterior surface of the lower grinding component 206 comprises a gripping surface 256 in the form of protuberances comprising bumps, and a portion of the exterior surface of the upper grinding component 208 comprises a gripping surface 258 in the form of protuberances comprising bumps. The gripping surface 256 extends circumferentially around the lower grinding component 206, and the griping surface 258 circumferentially around the upper grinding component 208. Such gripping surfaces represent another difference between the container 200 and container 100.

Another difference between the container 200 and container 100 is perhaps best illustrated in FIG. 13 and pertains to the grinding elements of the upper and lower grinding components 206,208. Whereas container 100 includes protuberances in the form of teeth, the grinding elements of the container 200 comprise concave recesses 282,284 formed in opposing surfaces 272,274 of the grinding components in the grinding area compartment. When the upper grinding component is received within the lower grinding component with the opposing surfaces having the concave recesses disposed proximate one another with the organic material pressured and sandwiched therebetween, the rotational movement of the grinding components that is schematically illustrated in FIG. 14 results in portions of the organic material being trapped within the recesses of the opposing rotating surfaces resulting in tearing and grinding.

Figure 15:
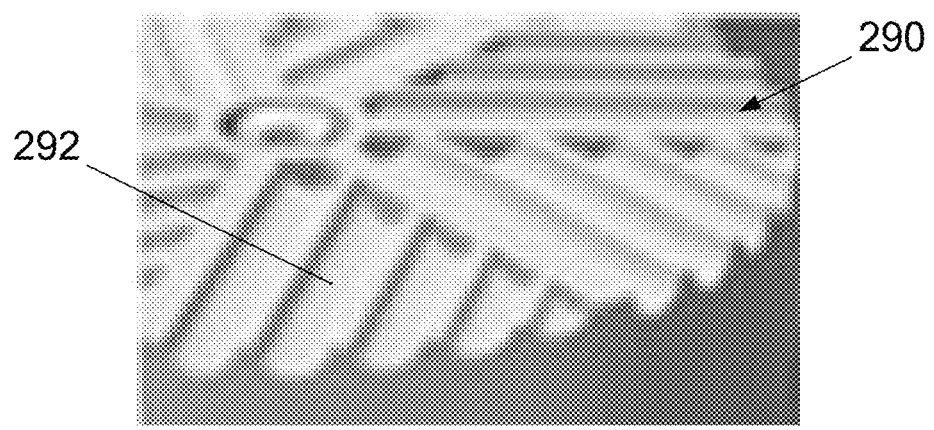
FIG. 15 is a perspective view of a contoured surface illustrating concave recesses formed therein which may be used as grinding elements as an alternative to the grinding elements in the form of protuberances such as teeth.

FIG. 15 is a perspective view of a contoured surface 290 illustrating concave recesses 292 formed therein, which may be used as grinding elements as alternatives to the grinding elements in the form of protuberances such as teeth. In particular, such contoured surface 290 may be used as the opposing surfaces of the grinding components 206,208 in the grinding area compartment.

Figure 16:
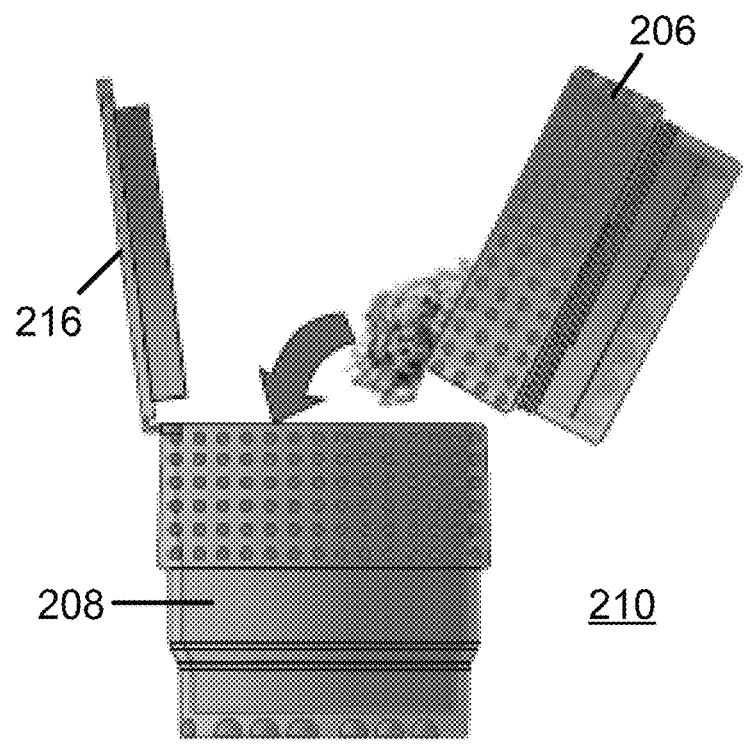
FIG. 16 is a side view of the upper and lower grinding components, wherein the lower grinding component is being used to pour ground lavender flower into a secondary storage area compartment of and formed in the upper grinding component.

FIG. 16 is a side view of the upper and lower grinding components 206,208 illustrating the controlled pouring of ground lavender flower from the lower grinding component 206 into the secondary storage of and formed in the upper grinding component 208. After pouring, the lid 216 is snap fit within the mouth of the upper grinding component 208 for sealing the secondary storage area compartment and preserving the ground lavender flower.

Figure 17:
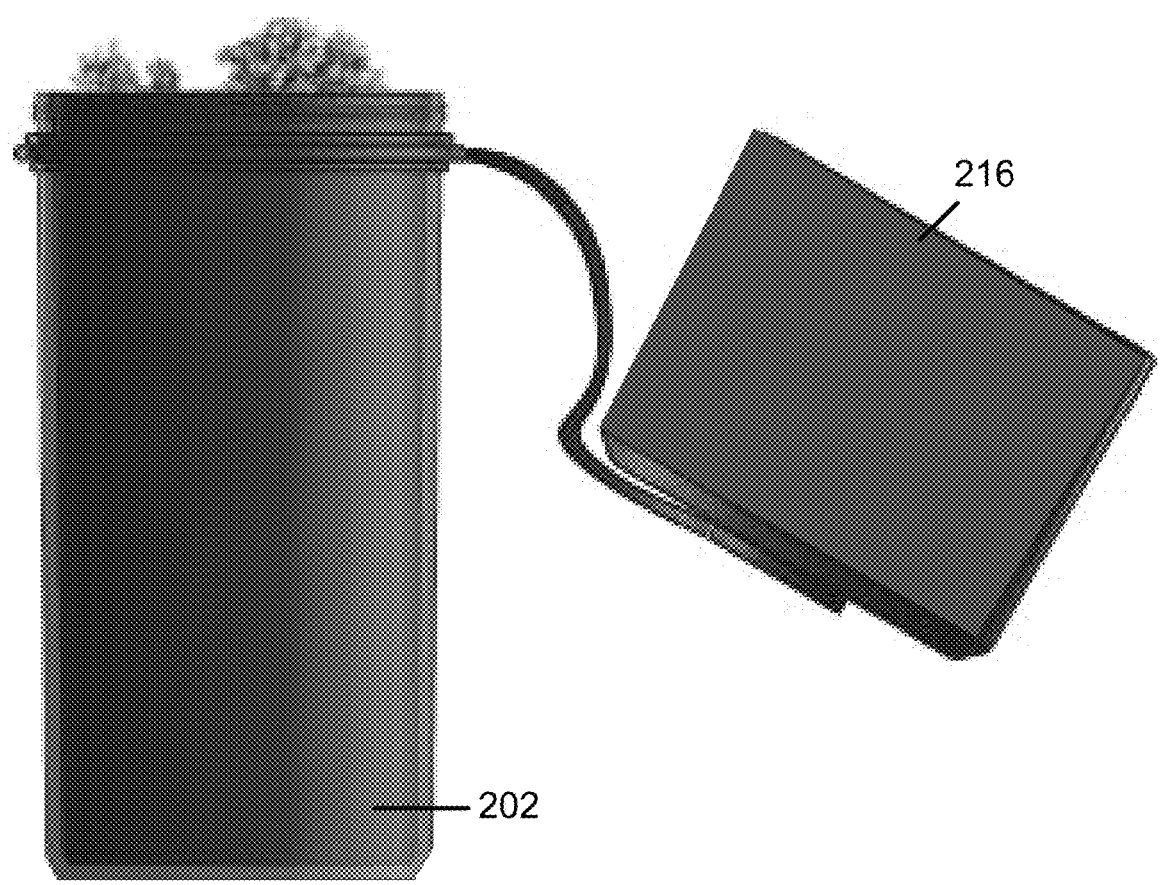
FIG. 17 is a side view of the body of the container of FIG. 12, wherein the unground lavender flower is seen in the storage area compartment thereof.

FIG. 17 is a side view of the body 202 of the container 200 showing that the cover 204 and body 202 of the container 200 can be used for primary storage without the presence of the grinder; in other words, the grinder is not a key component for use of the container for primary storage. Likewise, it will be appreciated that the cover and body of the container are not key components for use of the grinder for grinding and for secondary storage.

Based on the foregoing description, it will be readily understood by those persons skilled in the art that the invention has broad utility and application. Many embodiments and adaptations of the invention other than those specifically described herein, as well as many variations, modifications, and equivalent arrangements, will be apparent from or reasonably suggested by the invention and the foregoing descriptions thereof, without departing from the substance or scope of the invention.

Accordingly, while the invention has been described herein in detail in relation to one or more preferred embodiments, it is to be understood that this disclosure is only illustrative and exemplary of the invention and is made merely for the purpose of providing a full and enabling disclosure of the invention. The foregoing disclosure is not intended to be construed to limit the invention or otherwise exclude any such other embodiments, adaptations, variations, modifications or equivalent arrangements, the invention being limited only by the claims appended hereto and the equivalents thereof.

Thus, for example, it is contemplated that, instead of holding organic material that has been taken from the primary storage and ground, the secondary storage—the storage area compartment of the upper grinding component—can be used for a different organic material, such as a different species or different strain compared to that of the organic material stored in the primary storage of the container body.

What is claimed is:

1. A container, comprising:
a body comprising a primary storage area compartment,
a cover having threads on an interior surface thereof configured to mate with threads on an exterior of a rim of the body, by which the cover screws onto the body for sealing of the primary storage area compartment, and
a grinder comprising a wall configured to engage in frictional fit an interior wall that defines a mouth of the body leading into the primary storage area compartment proximate to and surrounded by the rim, by which wall the grinder further seals the primary storage area compartment,
wherein the grinder is completely enclosed within the container when the cover is screwed onto the rim of the body, and
wherein the grinder comprises both a lower grinding component comprising a grinding area compartment with grinding teeth and an upper grinding component comprising a secondary storage area compartment that is isolated from the grinding area compartment, the lower grinding component and the upper grinding component being separable components and the upper grinding component having a lid that closes off the secondary storage area compartment.

2. The container of claim 1, wherein the primary storage area compartment is larger than the secondary storage area compartment.

3. The container of claim 1, wherein the upper grinding component partially nests within the lower grinding component.

4. The container of claim 1, wherein the lower grinding component comprises a recess comprising the grinding area compartment.

5. The container of claim 1, wherein the upper grinding component is inserted into and partially received within a recess of the lower grinding component.

6. The container of claim 1, wherein the grinding area compartment with grinding teeth of the grinding area compartment comprises a first plurality of grinding teeth located on a bottom interior surface of the lower grinding component and a second plurality of grinding teeth located on a bottom exterior surface of the upper grinding component; and wherein the teeth of the lower grinding component are configured to extend adjacent the teeth of the upper grinding component when the upper grinding component is received within a recess of the lower grinding component.

7. The container of claim 1, wherein the lower grinding component is secured to the body of the container by a threaded connection.

8. The container of claim 7, wherein the lower grinding component comprises threads on an outer surface thereof, and the container comprises corresponding threads on an inner surface of the rim of the body, by which the lower grinding component screws onto the body of the container.

9. The container of claim 1, wherein the cover forms an airtight engagement with the body.

10. The container of claim 9, wherein the grinder forms an airtight engagement with the body.

11. The container of claim 10, wherein the lid forms an airtight engagement with the upper grinding component in closing off the secondary storage compartment.

12. The container of claim 9, wherein the lid forms an airtight engagement with the upper grinding component in closing off the secondary storage compartment.

13. The container of claim 1, wherein the cover and body of the container are configured to provide for primary storage without the presence of the grinder; and wherein the grinder is configured to provide grinding and secondary storage without the presence of the cover and the body.

14. The container of claim 1, wherein the grinder forms an airtight engagement with the body.

15. The container of claim 1, wherein the lid forms an airtight engagement with the upper grinding component in closing off the secondary storage compartment.

16. A container, comprising:
(a) a body comprising a rim having threads on an outer surface thereof and defining a primary storage area compartment for receiving, containing, and storing organic material, the rim defining a mouth leading to the primary storage area;
(b) a cover comprising threads located on an inner surface thereof by which the cover screws onto the body of the container in an airtight engagement so that the storing of the organic material within the primary storage area compartment is odorless; and
(c) a grinder comprising a lower grinding component and a separate upper grinding component,
  (i) wherein the lower grinding component comprises a rim and defines a grinding area compartment for grinding therein of the organic material, the rim of the lower grinding component defining a mouth leading to the grinding area compartment;
  (ii) wherein the lower grinding component further comprises a flange for engaging and resting upon the rim of the body when covering the mouth of the body and closing the primary storage area compartment;
  (iii) wherein the upper grinding component comprises a flange for engaging and resting upon the rim of the lower grinding component covering the mouth of the lower grinding component and closing the grinding area compartment;
  (iv) wherein the lower grinding component comprises a first plurality of grinding teeth located on a bottom interior surface of the grinding area compartment, and the upper grinding component comprises a second plurality of grinding teeth located on a bottom exterior surface thereof and configured to extend adjacent the first plurality of grinding teeth of the lower grinding component when the upper grinding component covers the mouth of the lower grinding component and closes off the grinding area compartment, whereby the first and second pluralities of grinding teeth operate to grind organic material received within the grinding area compartment during rotational movement between the upper and lower grinding components; and
  (v) wherein the upper grinding component comprises a secondary storage area compartment for receiving, containing, and storing organic material that has been ground in the grinding area compartment of the lower grinding component, the upper grinding component further comprising a lid configured to close off and seal the secondary storage area compartment in an airtight manner for odorless storage of ground organic material therein;

(d) wherein the grinder is configured to be completely enclosed by the cover and body when the cover is screwed onto the rim of the body with the upper grinding component covering the mouth of the lower grinding component and closing the grinding area compartment and with the lower grinding component covering the mouth of the body and closing the primary storage area compartment.

17. The container of claim 16, wherein the secondary storage area compartment is isolated from the grinding area compartment, the lower grinding component and the upper grinding component being separate components that removably couple together in a frictional fit.

18. The container of claim 16, wherein a portion of an exterior surface of the lower grinding component comprises a gripping surface in the form of ridges and a portion of an exterior surface of the upper grinding component comprises a gripping surface in the form of ridges, the gripping surfaces extending circumferentially around the grinding components for facilitating manual gripping thereof during rotation of the upper grinding component relative to the lower grinding component.

19. The container of claim 16, wherein a strap tethers the cover to the body.

\* \* \* \* \*